Patented June 27, 1933                                                              1,915,547

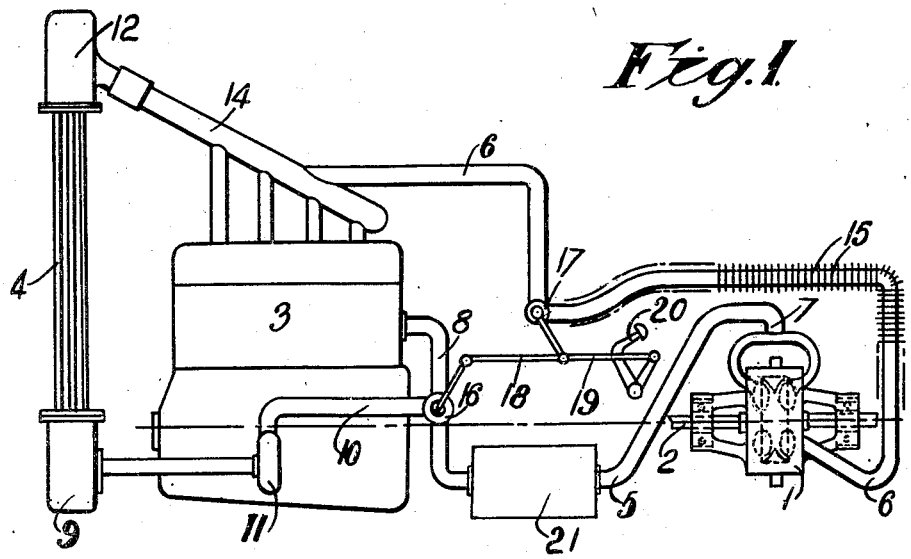
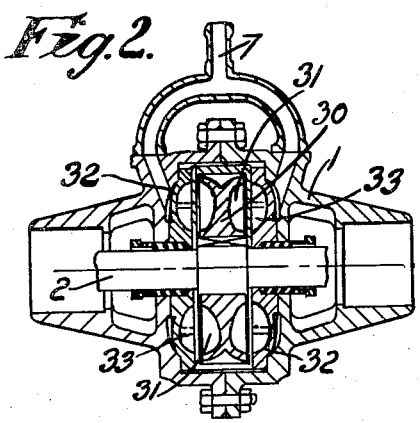
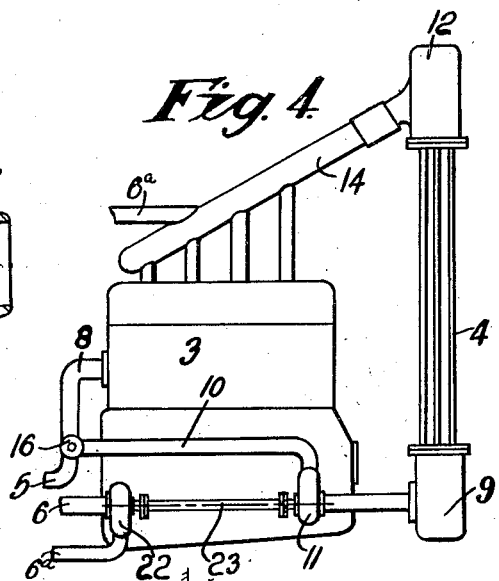
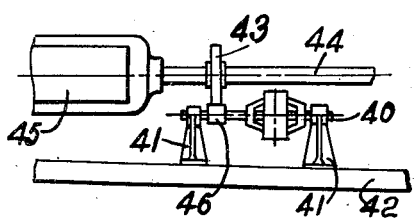
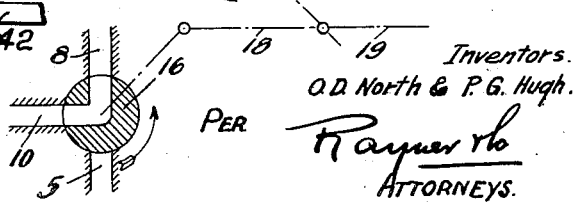
Inventors.
O. D. North & P. G. Hugh.
Per
Rayner &c
Attorneys.

UNITED STATES PATENT OFFICE

OLIVER DANSON NORTH AND PERCY GARIBALDI HUGH, OF LONDON, ENGLAND, ASSIGNORS TO SCAMMELL LORRIES LIMITED, OF LONDON, ENGLAND

BRAKE FOR ROAD VEHICLES

Application filed March 18, 1930, Serial No. 436,632, and in Great Britain March 23, 1929.

This invention relates to a brake for road vehicles particularly heavy motor lorries, charabancs, omnibuses and the like.

The object of the present invention is to provide a brake for road vehicles which will effectively retard the motion of the vehicle when applied and which can be kept continuously in operation for long periods without overheating. The types of brake most generally in use at the present time tend to overheat when in continuous use on long inclines. This lessens the efficiency of the brakes and is apt to render difficult the control of heavy vehicles. Brakes arranged according to this invention are provided with means for getting rid of the heat generated by the braking mechanism when in use for long periods. The brake is also arranged to effect a steady retardation and may be designed so that when in use the speed of the vehicle will be definitely restricted to some predetermined limit.

The invention broadly consists in coupling directly or indirectly to the prime mover and the driving wheels of the vehicle or to some or all of the wheels only, means for absorbing the power derived from the momentum of a road vehicle whether travelling under its own power or due solely to its inertia when travelling without being driven by its prime mover, for instance when running down an incline, the absorption of such power being by the selective utilization of an available absorbing medium of a fluid nature.

The preferred form of the present invention may briefly be related as consisting in mounting on a suitable rotating part of a vehicle's power transmission mechanism for instance on the driving shaft, a casing which may have somewhat the external appearance of a simple but quite small turbine, the said rotary part, for instance the driving shaft passing axially through said casing and journalled therein at bearings in the end of the casing. This casing accommodates rotors mounted on the said rotary part, and water circulating pipes deliver water into and out of the casing when desired, the rotors being so designed that a hydraulic resistance is set up inside the casing which destroys the power being conveyed through the said driving shaft or equivalent part.

The invention can be more readily understood if it is assumed that the said rotary part takes the place of the main shaft of a dynamometer, and that the said casing and its rotors are constructed after the principle of a dynamometer in which water is adapted to be circulated for the purpose of absorbing the power and acting as a brake to retard the vehicle. The dynamometer may be coupled by suitable pipes with the usual water cooling system of the road vehicle motor so that when in use the water from the dynamometer will be circulated through the cooling radiator so as to keep its temperature and that of the dynamometer within reasonable working limits.

Any suitable valve or valves can be provided for selectively connecting the interior of the casing to the source of water supply and for regulating the admission and emission of the water to and from the casing.

When necessary a supplementary water supply tank can be provided, and the capacity of the radiator header can be enlarged. A master valve for bringing the "dynamometer" or like device into instant operation can be operated from a lever readily accessible by the driver of the vehicle.

The heat generated by the destruction of the power in the rotating part when the device is brought into use will be carried away by the water, and the heat thus acquired by the water can be disseminated by any suitable cooling medium, such as the radiator or vanes on the water pipe of the device or one or more wide shallow enlargements in the said emission pipe.

The destruction of the power can be by forming pockets of appropriate configuration in the rotors in the said casing, these pockets creating vortices which destroy the power in the said rotating parts or shaft. The usual practice in dynamometers is to provide half ellipsoidal pockets in the opposing faces of the rotors for this purpose, the pockets being on both sides of a central rotor fixed to the shaft and in the inner faces of two outer stators fixed in the casing, the water having a reaction effect as it is driven by the central rotor into the pockets of the outer stators and is returned to the central rotor in a different direction.

The said casing can be free to swivel about the shaft and for this purpose the circulating pipes would be flexible. Should the normal speed of the driving shaft or other rotary part of the vehicle be too low for the purpose of the efficiency of the power absorbing device, the said device may have its own shaft and a suitable arrangement of gear wheels or their equivalent employed to connect the desired rotary part of the vehicle to the shaft of the device.

By means of the present invention the safety of heavy vehicles is materialy increased, and only a simple and instantaneous action is required to bring into immediate operation the equivalent of a highly efficient brake. The invention may be applied to trailer as well as driven vehicles.

In order that our invention may be readily understood and carried into effect, we have appended hereto a sheet of drawing, in which:—

Fig. 1 illustrates diagrammatically a method of applying this invention to a heavy motor vehicle operated by an internal combustion engine and in which the dynamometer brake is adapted to operate in conjunction with the water circulating and cooling system of the engine.

Fig. 2 is a sectional illustration of a known type of dynamometer brake suitable for use in connection with our invention.

Fig. 3 illustrates a modification in which the dynamometer brake is coupled to the driving shaft of the vehicle through the medium of suitable gearing, and Fig. 4 shows a modification of the water circulating system in which an auxiliary pump is employed to assist circulation of water in connection with the brake.

Fig. 5 illustrates an arrangement of control valves.

Referring to Fig. 1, the dynamometer brake 1 of any suitable known construction, is mounted upon a suitable moving part of the vehicle such for instance as the main transmission shaft 2 so that the rotor of the dynamometer 1 will always be turning on its axis when the motor vehicle is moving. The dynamometer 1 is coupled to the usual water circulating system of the engine 3 so that water may be supplied to the brake when in operation, and so that the heat absorbed by the water by the braking action set up will be circulated through the engine radiator 4 so as to dissipate the heat and keep down the temperature of the water and the parts of the brake to a suitable working temperature.

In the arrangement illustrated in Fig. 1, the dynamometer brake 1 is coupled to the water circulating system of the engine 3 by means of suitable pipes 5 and 6. The pipe 5 connects the water inlet 7 of the dynamometer brake 1 with the water supply pipe 8 through which water from the bottom water tank 9 of the radiator 4 is supplied to the cylinder jackets of the engine 3 by way of supply pipes 10 and a suitable water pump 11. The water outlet of the dynamometer brake 1 is connected by the pipe 6 to the upper water tank 12 of the radiator 4 in a suitable manner for instance by way of the water outlet pipe 14 of the engine 3. The pipe 6 may if desired be provided with gills or other form of radiating surface 15 to assist in dissipating the heat absorbed by the water in the dynamometer brake 1. A suitable valve 16 is arranged in the pipe 5 where it joins the pipes 8 and 10 of the engine circulating system, and a valve 17 is arranged in the pipe 6. These valves 16 and 17 are arranged to control the circulation of water from the engine circulating system through the dynamometer brake 1 when this is required to operate for the purpose of retarding the motion of the vehicle. For this purpose the valves 16 and 17 may be connected together by a light rod 18, and a second rod 19 connects them to a brake pedal 20. When the brake pedal 20 is operated, the valve 17 will be opened so as to connect the pipe 6 leading from the outlet of the dynamometer brake 1 to the water outlet pipe 14 of the engine 3, and from thence to the upper water tank 12 of the radiator 4. At the same time the valve 16 will be operated so as to connect the pipe 5 with the outlet pipe 10 leading from the water circulating pump 11 and which in turn draws water from the lower water tank 9 of the radiator 4. The valve 16 also acts to cut off the connection of the pipe 10 with the pipe 8 leading into the water jacket of the engine 3 so that water circulated by the pump 11 will pass directly along the pipe 5 to the inlet 7 of the dynamometer brake 1. Water will thus be circulated by the pump 11 through the dynamometer brake 1 and from thence it will pass out along the pipe 6 through the valve 17 to the engine outlet pipe 14 in the upper water tank 12 of the radiator 4, and from thence it will pass through the radiator 4 to the lower water tank 9, and back to the pump 11 so that a continuous water circulation will be maintained through the dynamometer brake 1. When the brake pedal 20 is released, the valve 17 will be closed and the valve 16 will cut off the pipe 5 from the water pump outlet 10 and will couple the water pump outlet to the engine water inlet pipe 8. The water will then be circulated by the pump 11 through the pipe 10, water inlet pipe 8 to the cylinder jacket of the engine, and from thence through the water outlet pipe 14 to the upper tank 12 of the radiator 4, through which it passes to the lower tank 9 and back to the pump 11. The water will then be circulated through the engine and radiator in the usual normal manner and the engine cooling system will be cut off from the dynamometer brake by the valves 16 and 17. When the valves 16 and 17 are moved to cut off the dynamometer brake 1 from the cooling system of the engine, the continued rotation of the rotor of the brake will expel the water from the brake casing through valve 17. The brake will then run dry and be inoperative. If desired an auxiliary water tank 21 may be coupled in any suitable part of the system such for instance as in a convenient position along the length of the pipe 5 or alternately in the pipe 6.

If desired an auxiliary additional or separate water pump may be employed for circulating the water through the dynamometer brake 1 and this additional water circulating pump may be so arranged that its inlet side will be coupled to the outlet of the dynamometer brake 1 so as to extract the water therefrom and to tend to keep the dynamometer brake in a dry state (that is free from water) when not in operation for braking purposes. An additional auxiliary pump 22 is shown in Fig. 4 mounted in line with the engine water pump 11 and coupled thereto by a driving shaft 23 and suitable flexible couplings. The suction side of the pump 22 may be coupled by the pipe 6 to the outlet from the dynamometer brake, whilst the delivery side of the pump may be coupled by the pipe 6a to deliver the water to the top tank 12 of the radiator 4 for instance by way of the engine water outlet pipe 14.

A suitable check or non-return valve may be located in any convenient position in the pipes leading to or from the dynamometer brake.

In Fig. 2 is illustrated diagrammatically the construction of a suitable known type of dynamometer brake 1. In this apparatus a rotor 30 is mounted on the shaft 2 and suitably shaped pockets 31 are arranged upon opposite faces of the rotor 30. In the two halves of the casing of the dynamometer are provided suitable fixed rings 32 and these are provided with pockets 23 arranged substantially opposite to and corresponding with the pockets 31 in the rotor 30. Suitable inlets and outlets allow water to pass into and circulate through the spaces provided by the pockets in the rotor 30 and the stationary parts 31. In action the rotor discharges water at high speed into the pockets in the casing from which it is returned at a reduced speed. This results in the creation of vortices which absorb and destroy power and retard the motion of the rotor, thus effecting the braking action on the part of the vehicle to which it is connected.

In Fig. 3 is illustrated diagrammatically an arrangement by which the dynamometer brake 1 is mounted upon a lay shaft 40 supported in bearings in brackets 41 mounted upon the side member 42 of the vehicle frame. The lay shaft 40 is driven from a suitable part of the vehicle through any suitable gearing so as to cause it to rotate at an increased speed. In the arrangement shown this geared up drive is effected by means of a suitable tooth gear 43 mounted on the transmission shaft 44 behind the gear box 45 and gears with a pinion 46 on the lay shaft 40 thus causing the dynamometer to be driven at a greater speed than the transmission shaft of the vehicle. This arrangement is particularly intended for use in connection with road vehicles having a low average road speed, such that the transmission shaft would normally rotate at a speed at which the efficiency of the dynamometer brake would not be very high. By gearing up the rate at which the dynamometer is driven its efficiency may be maintained for slow moving vehicles.

Brakes for vehicles constructed and operating according to our invention provide an effective means for retarding the motion of heavy vehicles, and enable the brake to be maintained in operation for long periods without overheating. The utilization of water or other fluid as the braking medium and the coupling of the dynamometer brake and the water circulating system and radiator of the engine enables the heat generated by the brake in retarding the vehicle to be dissipated through the usual engine radiator and ensures that there will at all times be a proper supply of water available for the dynamometer brake to ensure efficient braking action when required.

We claim:—

1. A brake system for a vehicle comprising in combination a dynamometer brake coupled to a moving portion of the vehicle so as to be driven thereby, the said brake being adapted to be filled with water, a prime mover having a water circulating or delivery system, means adapted to connect said brake with said water circulating or delivery system, means adapted to be actuated to divert a stream of water passing to the prime mover to the brake to cause the water to circulate therethrough or to cut off the circulation of water to the brake and restore the circulation through or delivery to the prime mover when braking action is not required, and means for cooling the fluid after its passage through the brake.

2. A brake system for a vehicle comprising in combination a dynamometer brake coupled to a moving portion of the vehicle so as to be driven thereby, the said brake being adapted to be filled with fluid, say water, by agitation of which heat is generated, a prime mover having a water or other fluid circulating or delivery system, a pump adapted to drive the water or other fluid through said circulating or delivery system, means adapted to connect said brake with said water circulating or delivery system on the delivery side of the pump, means adapted to be actuated to divert a stream of water passing to the prime mover to the brake to cause the water to circulate therethrough or to cut off the circulation of water to the brake and restore the circulation through or delivery to the prime mover when braking action is not required, and means for cooling the fluid after its passage through the brake.

3. A brake system for a vehicle comprising in combination a dynamometer brake coupled to a moving portion of the vehicle so as to be driven thereby the said brake being adapted to be filled with fluid, say water, by agitation of which heat is generated, a prime mover having a water or other fluid circulating or delivery system, a pump adapted to drive the water or other fluid through said circulating or delivery system, a heat radiator in said circulating or delivery system adapted to dispel the heat in the circulating or like fluid, means adapted to connect said brake with said water circulating or delivery system on the delivery side of the pump, means adapted to be actuated to divert a stream of water passing to the prime mover to the brake to cause the water to circulate therethrough or to cut off the circulation of water to the brake and restore the circulation through or delivery to the prime mover when braking action is not required, and means for cooling the fluid after its passage through the brake.

4. A brake system for a vehicle comprising in combination a dynamometer brake coupled to a moving portion of the vehicle so as to be driven thereby, the said brake being adapted to be filled with fluid by agitation of which heat is generated, means for circulating said fluid through the brake, radiating means associated with said fluid circulating means for giving off the heat from the fluid after its passage through the brake and means for extracting fluid from the brake tending to keep the brake free from fluid.

5. A brake system for a vehicle comprising in combination a dynamometer brake coupled to a moving portion of the vehicle so as to be driven thereby the said brake being adapted to be filled with water, a prime mover having a water circulating or delivery system, a pump adapted to drive the water or other fluid through said circulating or delivery system, means adapted to connect said brake with said water circulating or delivery system on the delivery side of the pump, means adapted to be actuated to direct a stream of water through the circulating system or through the pump, and an additional or an auxiliary pump having its inlet connected to the water outflow side of the brake and adapted to drain water therefrom.

6. A brake system for a vehicle comprising in combination a dynamometer brake coupled to a moving portion of the vehicle so as to be driven thereby the said brake being adapted to be filled with water, a prime mover having a water circulating or delivery system, a pump adapted to drive the water or other fluid through said circulating or delivery system, means adapted to connect said brake with said water circulating or delivery system on the delivery side of the pump, a valve in said circulating system at the point of connection to the pump adapted to be actuated to direct a stream of water through the circulating system or through the pump, an additional or an auxiliary pump having its inlet connected to the water outflow side of the brake and adapted to drain water therefrom, means for cooling the water delivered from said additional or auxiliary pump and means for returning the cooled water to the prime mover circulating system.

7. A brake system for a vehicle comprising in combination a dynamometer brake coupled to a moving portion of the vehicle so as to be driven thereby, the said brake being adapted to be filled with water, a prime mover having a water circulating or delivery system, a pump adapted to drive the water or other fluid through said circulating or delivery system, means adapted to connect said brake with said water circulating or delivery system on the delivery side of the pump, a valve in said circulating system at the point of connection to the pump adapted to be actuated to direct a stream of water through the circulating system or through the pump, an additional or an auxiliary pump having its inlet connected to the water outflow side of the brake and adapted to drain water therefrom, a radiator in said prime mover circulating system and a connection from the delivery side of the said additional or auxiliary brake to the inlet side of said radiator.

8. A brake system for a vehicle comprising in combination a dynamometer brake of which the casing is adapted to be filled with fluid, vanes or the like in said brake casing adapted to be rotated to agitate said fluid to absorb energy, means for rotating said vanes, a pump adapted to deliver water to the brake when it is required to operate, an additional or auxiliary pump adapted to extract water from the brake casing tending to keep the brake dry.

9. A brake system for a vehicle comprising in combination a dynamometer brake of which the casing is adapted to be filled with fluid, vanes or like in said brake casing rotatably carried on a shaft passing through the brake casing said shaft being adapted to be rotated whenever the driving wheels of the vehicle move, whereby the vanes are actuated to agitate the fluid in the brake casing to absorb the kinetic energy of the vehicle, a pump adapted to deliver water to the brake when it is required to operate, means tending to keep the brake dry, and means for cooling said fluid after its passage through the brake.

10. A brake system for a vehicle comprising in combination a dynamometer brake of which the casing is adapted to be filled with fluid, vanes or like in said brake casing, adapted to be rotated to agitate said fluid to absorb energy, means for rotating said vanes, pockets in said brake casing co-operating with said vanes, means for delivering fluid through the brake when it is required to operate, and means tending to keep the brake dry.

11. A brake system for a vehicle comprising in combination a dynamometer brake of which the casing is adapted to be filled with fluid, a power unit adapted to drive said vehicle, vanes or like carried on a shaft within said casing and adapted to be rotated when the driving wheels rotate and co-operating with pockets in the casing to agitate fluid to absorb the kinetic energy of the vehicle, a pump adapted to deliver water to the brake when it is required to operate, an additional or auxiliary pump adapted to extract water from the brake casing, tending to keep the brake dry, both said pumps being adapted to be driven by the said power unit, and a fluid circulating or delivery system associated with said power unit comprising said first named pump and a radiator, a connection to the fluid circulating or delivery system from the brake casing on the delivery side of said pump, a valve at the point of connection of the circulating system and the pump adapted to be actuated to direct a stream of water through the circulating system or through the pump, and a connection from the delivery side of the additional or auxiliary pump to permit the delivery of water to the radiator.

12. In a brake system for a vehicle, a dynamometer brake driven from a power driven portion of the vehicle, means adapted to connect said brake to a liquid circulating system and means to divert a stream of liquid passing to the engine of the vehicle to the brake to cause the liquid to circulate through the brake or to cut off the circulation of liquid to the brake and restore the delivering to the engine when braking action is not required.

OLIVER DANSON NORTH.
PERCY GARIBALDI HUGH.